United States Patent
So et al.

(10) Patent No.: US 9,712,345 B2
(45) Date of Patent: Jul. 18, 2017

(54) COMMUNICATION DEVICE AND METHOD OF CONTROLLING SAME

(71) Applicant: Samsung Electronics Co., Ltd., Gyeonggi-do (KR)

(72) Inventors: Jin-Hyun So, Seoul (KR); Soo-Bok Yeo, Gyeonggi-do (KR); Se-Jin Kong, Gyeonggi-do (KR); Seok-Joong Heo, Seoul (KR); Min-Goo Kim, Gyeonggi-do (KR); Chae-Hag Yi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/057,646

(22) Filed: Mar. 1, 2016

(65) Prior Publication Data

US 2016/0294581 A1 Oct. 6, 2016

Related U.S. Application Data

(60) Provisional application No. 62/143,507, filed on Apr. 6, 2015.

(30) Foreign Application Priority Data

Oct. 29, 2015 (KR) ........................ 10-2015-0151308

(51) Int. Cl.
*H04L 25/03* (2006.01)
*H04L 25/02* (2006.01)

(52) U.S. Cl.
CPC .... *H04L 25/03019* (2013.01); *H04L 25/0222* (2013.01)

(58) Field of Classification Search
CPC .......... H04L 25/03019; H04L 25/0232; H04L 25/0226; H04L 25/03605; H04L 25/025; H04L 25/0222
See application file for complete search history.

(56) References Cited

U.S. PATENT DOCUMENTS

| | | | |
|---|---|---|---|
| 7,085,317 B2 | 8/2006 | Malladi et al. | |
| 7,675,962 B2 | 3/2010 | Mergen et al. | |
| 2003/0231725 A1* | 12/2003 | Scarpa | H04L 25/022 375/350 |
| 2004/0203812 A1 | 10/2004 | Malladi et al. | |
| 2005/0207508 A1* | 9/2005 | Singh | H04B 7/084 375/267 |

(Continued)

*Primary Examiner* — Syed Haider
(74) *Attorney, Agent, or Firm* — The Farrell Law Firm, P.C.

(57) ABSTRACT

A communication device and method of controlling the same are provided. A communication device includes a transceiver that receives a radio signal and a processor electrically connected to the transceiver, and is configured to store a data signal including data received through the radio signal in a first buffer according to a first delay period, store a channel signal including channel estimation information on a transmission channel of the radio signal in a second buffer according to a second delay period, determines a coefficient of a low pass filter and a group delay related to the low pass filter based on information related to the radio signal, and output at least one of the channel signals stored in the second buffer based on the determined group delay and the first delay period to perform equalizing.

20 Claims, 10 Drawing Sheets

(56) References Cited

U.S. PATENT DOCUMENTS

| | | | |
|---|---|---|---|
| 2006/0018368 A1* | 1/2006 | Yang | H04B 7/0613 375/149 |
| 2006/0128326 A1* | 6/2006 | Pietraski | H04L 25/0212 455/130 |
| 2007/0110200 A1 | 5/2007 | Mergen et al. | |
| 2007/0202824 A1 | 8/2007 | Malladi et al. | |
| 2008/0152043 A1* | 6/2008 | Eun | H04L 25/0232 375/340 |
| 2010/0054380 A1* | 3/2010 | Valadon | H04L 25/0228 375/350 |
| 2014/0270022 A1* | 9/2014 | Takagi | H04L 25/0204 375/350 |
| 2014/0341326 A1* | 11/2014 | Choi | H04L 25/0214 375/350 |
| 2015/0141034 A1* | 5/2015 | Ekbatani | H04L 25/0204 455/456.1 |

* cited by examiner

COMMUNICATION DEVICE AND METHOD OF CONTROLLING SAME

PRIORITY

This application claims priority under 35 U.S.C. §119(e) to U.S. Provisional Patent Application Ser. No. 62/143,507, filed on Apr. 6, 2015, and under 35 U.S.C. §119(a) to Korean Patent Application Serial No. 10-2015-0151308, filed on Oct. 29, 2015, the entire content of each of which is incorporated herein by reference.

BACKGROUND

1. Field of the Disclosure

The present disclosure generally relates to a communication device and method of controlling the same, and more particularly, to a communication device and method for equalizing a received signal.

2. Description of the Related Art

As high speed mobile communication systems such as Wideband Code Division Multiple Access (WCDMA) or High Speed Downlink Packet Access (HSDPA) are commercialized, a receiver based on an equalizer suitable for high speed mobile communication systems has been researched and developed.

The receiver based on equalization may include a channel estimator and an equalizer. The equalizer may be based on a channel estimated through the channel estimator.

SUMMARY

The present disclosure has been made to address at least the above disadvantages and other disadvantages not described above, and to provide at least the advantages described below.

According to an aspect of the present disclosure, a communication device is provided. The communication device may calculate a Signal to Noise Ratio (SNR) of a received signal by using a received signal strength (for example, a RSSI) already calculated by a component such as an automatic gain controller and determine a coefficient of the low pass filter (LPF) based on an estimated Doppler frequency and the calculated SNR, so as to increase reliability and reduce power consumption when equalizing is performed.

According to another aspect of the present disclosure, a communication device is provided which may control a channel signal and a data signal to have a predetermined group delay based on the determined filter coefficient and perform the equalizing by using the channel signal and the data signal having the predetermined group delay, thereby improving reception performance.

According to another aspect of the present disclosure, a method of controlling a communication device is provided which may increase reliability and decrease power consumption when equalizing is performed, by calculating a signal to noise ratio of a received signal by using a received signal strength already calculated by an element such as an automatic gain controller and determining a coefficient of the low pass filter based on an estimated Doppler frequency and the calculated signal to noise ratio.

According to another aspect of the present disclosure, a method of controlling a communication device is provided having an improved reception performance by controlling a channel signal and a data signal to have a predetermined group delay based on the determined filter coefficient and performing the equalizing by using the channel signal and the data signal, having the predetermined group delay.

According to another aspect of the present disclosure, it is possible to increase reliability and decrease power consumption of a receiver when equalizing is performed by calculating a signal to noise ratio of a received signal by using a received signal strength, which has been already calculated by an element such as an automatic gain controller and determining a coefficient of a low pass filter based on an estimated Doppler frequency and the calculated signal to noise ratio.

According to another aspect of the present disclosure, it is possible to improve reception performance by controlling a channel signal and a data signal to have a predetermined group delay based on the determined filter coefficient and performing the equalizing by using the channel signal and the data signal, which have the predetermined group delay.

According to another aspect of the present disclosure, a communication device is provided. The communication device includes a transceiver that receives a radio signal and a processor electrically connected to the transceiver, and is configured to store a data signal including data received through the radio signal in a first buffer according to a first delay period, store a channel signal including channel estimation information on a transmission channel of the radio signal in a second buffer according to a second delay period, determines a coefficient of a low pass filter and a group delay related to the low pass filter based on information related to the radio signal, and output at least one of the channel signals stored in the second buffer based on the determined group delay and the first delay period to perform equalizing.

According to another aspect of the present disclosure, a method of controlling a communication device is provided. The method includes receiving a radio signal, storing a data signal including data received through the radio signal in a first buffer according to a first delay period, storing a channel signal including channel estimation information on a transmission channel of the radio signal in a second buffer according to a second delay period, determining a coefficient of a low pass filter and a group delay related to the low pass filter based on information related to the radio signal, and outputting at least some of the channel signals stored in the second buffer based on the determined group delay and the first delay period to perform equalizing.

According to another aspect of the present disclosure, a chipset for controlling a user equipment (UE) in a mobile communication system is provided, the chipset configured to store a data signal including data received through a radio signal in a first buffer according to a first delay period, store a channel signal including channel estimation information on a transmission channel of the radio signal in a second buffer according to a second delay period, determine a coefficient of a low pass filter and a group delay related to the low pass filter based on information related to the radio signal and output at least one of the channel signals stored in the second buffer based on the determined group delay and the first delay period to perform equalizing.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1A:
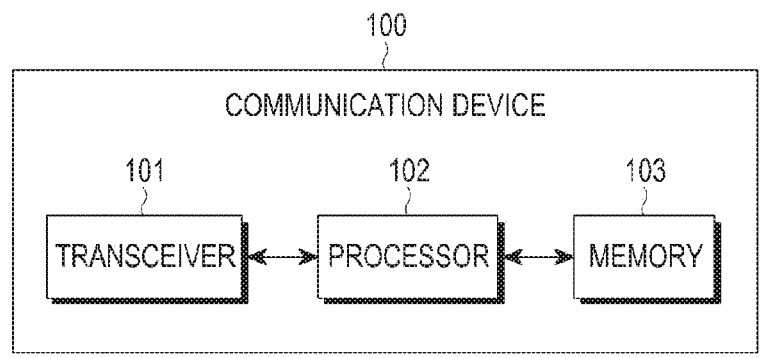
FIG. 1A is a block diagram of a communication device according to various embodiments of the present disclosure.

Hereinafter, various embodiments of the present disclosure will be described with reference to the accompanying drawings. However, it should be understood that there is no limiting the present disclosure to the particular forms disclosed herein, rather, the present disclosure should be construed to cover various modifications, equivalents, and/or alternatives of embodiments of the present disclosure. In describing the drawings, similar reference numerals may be used to designate similar constituent elements.

As used herein, the expressions "have", "may have", "include", or "may include" refer to the existence of a corresponding feature (e.g., numeral, function, operation, or constituent element such as component), and do not exclude one or more additional features.

In the present disclosure, the expressions "A or B", "at least one of A or/and B", or "one or more of A or/and B" include all possible combinations of the items listed. For example, the expression "A or B", "at least one of A and B", or "at least one of A or B" refers to all of (1) including at least one A, (2) including at least one B, or (3) including all of at least one A and at least one B.

The expressions "a first", "a second", "the first", or "the second" used in various embodiments of the present disclosure may modify various components regardless of the order and/or the importance and does not limit the corresponding components. For example, a first user device and a second user device indicate different user devices although both of them are user devices. For example, a first element may be referred to as a second element, and similarly, a second element may be referred to as a first element without departing from the scope of the present disclosure.

It should be understood that when an element (e.g., first element) is referred to as being (operatively or communicatively) "connected," or "coupled," to another element (e.g., second element), it may be directly connected or directly coupled to the other element or any other element (e.g., third element) may be interposed between them. In contrast, it may be understood that when an element (e.g., first element) is referred to as being "directly connected," or "directly coupled" to another element (second element), there are no elements (e.g., third element) interposed between them.

The expression "configured to" used in the present disclosure may be used interchangeably with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "control module adapted (or configured) to perform A, B, and C" may mean a dedicated control module (e.g. embedded control module) only for performing the corresponding operations or a generic-purpose control module (e.g., central processing unit (CPU) or application processor (AP)) that can perform the corresponding operations by executing one or more software programs stored in a storage module device.

The terms used herein are for the purpose of describing particular embodiments and do not limit the scope of other embodiments. As used herein, singular forms may include plural forms as well, unless the context clearly indicates otherwise. Unless defined otherwise, all terms used herein, including technical and scientific terms, have the same meaning as those commonly understood by a person skilled in the art to which the present disclosure pertains. Terms such as those defined in a generally used dictionary may be interpreted to have the meanings as the contextual meanings in the relevant field of art, and are not to be interpreted to have ideal or excessively formal meanings unless clearly defined in the present disclosure. In some cases, even a term defined in the present disclosure should not be interpreted to exclude embodiments of the present disclosure.

A communication device and a User Equipment (UP) according to various embodiments of the present disclosure will be described with reference to the accompanying drawings. In the present disclosure, the term user may refer to a person who uses the communication device, a device (for example, an artificial intelligence device) which uses the communication device, a person who uses the UE, or a device which uses the UE.

Referring to FIG. 1A, a communication device 100 according to various embodiments of the present disclosure include at least one of a transceiver 101, a processor 102, and a memory 103.

The transceiver 101 may configure communication between, for example, the communication device 100 and an external device (for example, a first external electronic device 130, a second external electronic device 140, or a server 150). For example, the transceiver 101 may be connected to a network 120 through wireless communication or wired communication, so as to communicate with the external device. The "transceiver 101" is interchangeable with various terms such as a "communication module" and a "communication interface".

The wireless communication may use at least one of, for example, Long Term Evolution (LTE), LTE-Advanced (LTE-A), Code Division Multiple Access (CDMA), Wideband CDMA (WCDMA), Universal Mobile Telecommunications System (UMTS), WiBro (Wireless Broadband), and Global System for Mobile Communications (GSM), as a cellular communication protocol. Further, the wireless communication may include, for example, short-range communication. The short-range communication may include at least one of, for example, Wi-Fi, Bluetooth, Near Field Communication (NFC), and Global Navigation Satellite System (GNSS). The GNSS may include at least one of, for example, a Global Positioning System (GPS), a Global Navigation Satellite System (Glonass), a Beidou Navigation Satellite System (Beidou), and a European Global Satellite-based Navigation System (Galileo), according to a use area, a bandwidth requirement, and the like.

The wired communication may include at least one of, for example, a Universal Serial Bus (USB), a High Definition Multimedia Interface (HDMI), Recommended Standard 232 (RS-232), and a Plain Old Telephone Service (POTS). The network 120 may include at least one of telecommunication networks such as a computer network (for example, a LAN or a WAN), the Internet, and a telephone network.

The processor 102 may include a Communication Processor (CP). According to various embodiments of the present disclosure, the processor 102 may include one or more of a Central Processing Unit (CPU) and an Application Processor (AP). The processor 102 may control, for example, at least one other element of the communication device 100 and/or carry out operations or data processing related to communication. The term "processor" is interchangeable with various terms such as a "chipset", "control module", a "control unit", and a "controller" in some embodiments.

The memory 103 may include a volatile memory and/or a non-volatile memory. The memory 103 may store, for example, instructions or data related to at least one other element of the communication device 100. The memory 103 may store software and/or a program. The program may include, for example, a kernel, middleware, an Application Programming Interface (API), and/or an application program (or "application"). Although FIG. 1A illustrates that the memory 103 is included in the communication device 100, this is only an example for describing the present disclosure. The memory 103 may be omitted from the communication device 100.

Figure 1B:
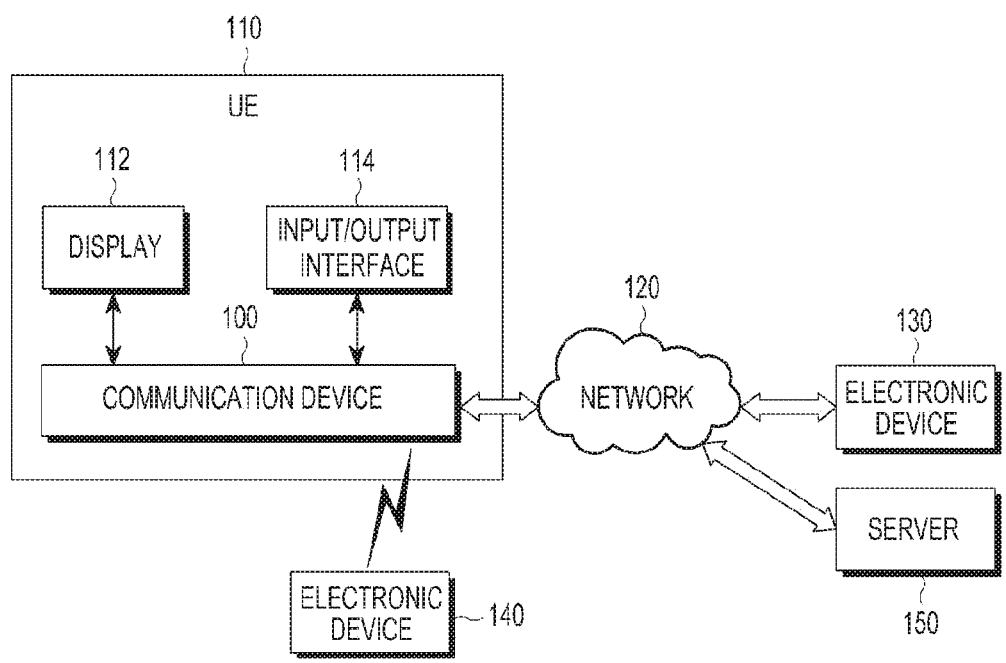
FIG. 1B is a block diagram of a User Equipment (UE) in a network environment according to various embodiments of the present disclosure.

FIG. 1B is a block diagram of a UE in a network environment according to various embodiments of the present disclosure.

Referring to FIG. 1B, a UE 110 according to various embodiments of the present disclosure includes a communication device 100, a display 112, and an input/output interface 114.

The display 112 may include, for example, a Liquid Crystal Display (LCD), a Light-Emitting Diode (LED) display, an Organic Light-Emitting Diode (OLED) display, a MicroElectroMechanical Systems (MEMS) display, and an electronic paper display. The display 112 may display various types of content (for example, text, images, videos, icons, or symbols) to users. The display 112 may include a touch screen and receive, for example, a touch input, a gesture input, a proximity input, or a hovering input using an electronic pen or a user's body part.

The input/output interface 114 may be an interface that transfers instructions or data input from a user or another external device, to another element(s) of the UE 110. Further, the input/output interface 114 may output instructions or data received from another element(s) of the UE 110 to a user or another external device.

According to various embodiments of the present disclosure, the UE 110 may further include a storage module (for example, a memory) or a processor (for example, an application processor).

Figure 2A:
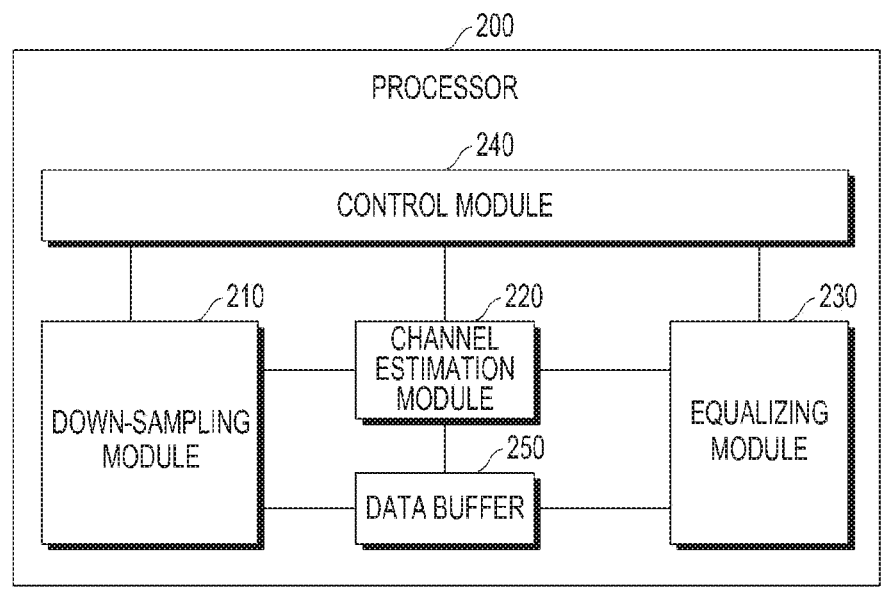
FIG. 2A is a block diagram of components of a processor illustrated in FIG. 1A according to various embodiments of the present disclosure.
Figure 2B:
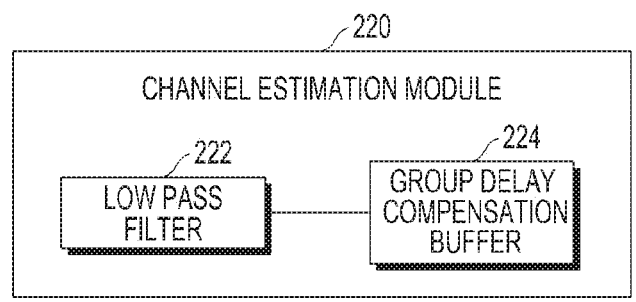
FIG. 2B is a block diagram of a channel estimation module according to various embodiments of the present disclosure.

FIG. 2A is a block diagram of components of a processor illustrated in FIG. 1A. FIG. 2B is a block diagram of a channel estimation module according to various embodiments of the present disclosure.

Referring to FIG. 2A, the processor 102 (which may also be referred to as a chipset) includes a down sampling module 210, a channel estimation module 220, an equalizing module 230, a control module 240, and a data buffer 250.

The down sampling module 210 may down-sample a signal generated by sampling the radio signal received by the transceiver 101 at several times the chip rate (for example, four times the chip rate) and transmit the signal to the channel estimation module 220. The chip rate may be 3.84 Mega chips per second (Mcps), but this is only an example for describing the present disclosure. The radio signal received by the transceiver 101 may pass through, for example, a matched filter (for example, matched filter 511) and then be converted into a digital signal sampled at several times the chip rate.

The channel estimation module 220 includes a low pass filter 222 that performs low pass filtering on the received signal and a group delay compensation buffer 224 that temporarily stores a channel signal including a channel estimation value (for example, $h_0[r]$) having passed through the low pass filtering according to a specific storage period (in other words, delay and output the channel signal according to a specific delay period). The channel estimation may be estimation of a transmission channel in which the radio signal or the data is transmitted. The specific storage period (for example, 1 symbol period (referred to as a "symbol" in the present disclosure)) of the group delay compensation buffer 224 may be predetermined to be, for example, a value smaller than a storage period of the data buffer 250. The low pass filter 222 may include, for example, at least one Infinite Impulse Response (IIR) filter. According to various embodiments of the present disclosure, the data buffer 250 may temporarily store a data signal including specific data received through the radio signal according to a preset storage period (for example, 5 symbols). The group delay compensation buffer 224 and the data buffer 250 may be buffers having a First Input First Output (FIFO) structure that store and output signals, which are input into the buffers. The term "storage period" may be referred to as the term "delay period", "delay time", or "output period" in terms of a data output.

The channel estimation module 220 may receive, for example, information on a Received Signal Strength Indication (RSSI) estimated by an Automatic Gain Controller (AGC), which is electrically connected to the communication device 100, from the AGC. The channel estimation module 220 may estimate (in other words, calculate) a Signal to Noise Ratio (SNR) of the radio signal received by the transceiver 101 by using the RSSI. The channel estimation module 220 may estimate the SNR of the received radio signal by using the RSSI estimated by the AGC. The communication device 100 may use the RSSI estimated by the AGC for estimating the SNR when performing the equalizing.

In a wireless communication system, when channel information is received through L taps, a received signal y[k] may be expressed as shown in Equation (1) below.

$$y[k] = \sum_{m=0}^{L-1} h[m]x[k-m] + n[k] \quad (1)$$

In Equation (1) above, $x[k-m]$ denotes a $(k-m)^{th}$ sample of a transmitted signal, $h[m]$ denotes a theoretical channel value of an $m^{th}$ tap, and $n[k]$ denotes a $k^{th}$ sample of a noise signal. In Equation (1), a case where the $h[m]$ value does not change over time (for example, the sample k) for a coherence time is assumed. A transmitted signal $x[k]$ may be expressed as shown in Equation (2) below.

$$x[k] = z[k]\left(\sqrt{E^{CPICH}}\, p[k] + \sum_{q=0}^{Q-1} \sqrt{E^q}\, d^q[k]\right) \quad (2)$$

In Equation (2) above, $z[k]$ denotes a $k^{th}$ sample of a complex spread signal, $p[k]$ denotes a $k^{th}$ sample of a pilot signal, $d^q[k]$ denotes a signal of a $q^{th}$ user, Q denotes a number of users, $\sqrt{E^{CPICH}}$ denotes an energy of a pilot channel signal, and $\sqrt{E^q}$ denotes an energy of a $q^{th}$ user signal. The received signal $y[k]$ may be expressed in the form of a vector $y_k=[y[k]y[k-1]\ldots y[k-N_c+1]]^T$, wherein $N_c$ denotes a period of accumulation of pilot signals, in other words, an update period of the channel estimation value. $N_c$ may be, for example, 1 symbol period and, when $N_c$ corresponds to 512 chips, the 1 symbol period may be 133.3 microseconds (μs). T denotes a transposed matrix, and $y[k-N_c+1]$ may be an expression of a vector of a $(k-N_c+1)^{th}$ sample of the received signal. The spread signal during $N_c$ may be expressed as a diagonal matrix Z, and the pilot signal may be expressed by P. Accordingly, a de-spread pilot signal may be expressed by $\tilde{p}=Zp$, and a channel estimation value $h_{raw}[r]$ for an $r^{th}$ tap before the low pass filtering may be expressed as shown in Equation (3) below.

$$h_{raw}[r] = \\ (\tilde{p}^H\tilde{p})^{-1}\tilde{p}^H y_{k+r} = \sqrt{E^{CPICH}}\, h[r] + \frac{1}{N_c}\left(\sum_{m\neq r}^{L-1} \tilde{p}^H x_{k+r-m}h_m + \tilde{p}^H n_{k+r}\right). \quad (3)$$

In Equation (3) above, $\tilde{p}^H$ denotes a conjugate transpose matrix for the de-spread pilot signal, $y_{k+r}$ denotes an expression of a vector for a $(k+r)^{th}$ sample of the received signal, $h[r]$ denotes a theoretical channel value of an $r^{th}$ tap, in other words, a target channel value to be estimated by the channel estimation module 220, $x_{k+r-m}$ denotes an expression of a vector for a $(k+r-m)^{th}$ sample of the transmitted signal, $h_m$ denotes a theoretical channel value of an $m^{th}$ tap, and $n_{k+r}$ denotes an expression of a vector for a $(k+r)^{th}$ sample of the noise signal. Briefly, in equation (3) above, $\sqrt{E^{CPICH}}h[r]$ may be classified to be a channel signal part, and $$\frac{1}{N_c}\left(\sum_{m\neq r}^{L-1} \tilde{p}^H x_{k+r-m}h_m + \tilde{p}^H n_{k+r}\right)$$

may be classified to be a noise signal part.

When a signal after the channel estimation value $h_{raw}[r]$ passes through the low pass filtering by the low pass filter 220 is $h_o[r]$, the channel estimation value $h_o[r]$ having reduced noise and interference may be expressed as shown in Equation (4).

$$h_o[r] = \sqrt{E^{CPICH}}h[r] + \tilde{\sigma}^2 \quad (4)$$

In Equation (4) above, $\tilde{\sigma}^2$ denotes a variance of reduced noise after the low pass filtering by the low pass filter 222. When $\tilde{\sigma}^2$ is very small, $E[|h_o[r]|^2]$ may be expressed as shown in Equation (5) below. $E[|h_o[r]|^2]$ denotes an average of power for $h_o[r]$. Equation (5) below may be associated with a signal strength of the channel signal part mentioned in Equation (3) above.

$$E[|h_o[r]|^2] \approx E^{CPICH}|h[r]|^2 \quad (5)$$

Further, a strength of the noise part expressed in equation (3) above may be calculated using the RSSI. When $I_{or}$ is a transmitted signal strength, $I_o$ may be expressed as shown in Equation (6) below.

$$I_o \approx \frac{1}{N_c}\left(\sum_{m\neq r}^{L-1} |h_m|^2 I_{or} + \sigma^2\right) \quad (6)$$

In Equation (6) above, $\sigma^2$ denotes a variance of noise for a channel estimation value before the low pass filtering is performed. The channel estimation module 202 may include a plurality of taps, and when the radio signal is received through the plurality of taps, the channel estimation module 202 may estimate a SNR of each tap based on Equation (7) below.

$$SNR = \frac{N_c E[|h_o[r]|^2]}{I_o} \quad (7)$$

The channel estimation module 220 may estimate a Doppler frequency of the received radio signal. The channel estimation module 220 may determine a coefficient of the low pass filter and a group delay corresponding to the coefficient based on the estimated SNR and Doppler frequency. A relation between the estimated SNR, Doppler frequency, coefficient of the low pass filter and the group delay corresponding to the coefficient (in other words, the group delay generated by the low pass filtering) may be pre-stored in the memory 103 in the form of a lookup table. The lookup table may include, for example, a correlation in which the coefficient of the low pass filter is 0.125 and the group delay corresponding to the coefficient of the low pass filter is 5 symbols when the estimated Doppler frequency is 5.9 Hz and the estimated SNR is 18 dB. According to various embodiments of the present disclosure, the coefficient of the low pass filter included in the lookup table may be a coefficient, which makes a mean square error of the signal before the performance of the low pass filtering and the signal after the performance of the low pass filtering, a minimum. The mean square error may be expressed as shown in, for example, Equation (8) below.

$$MSE = E\left[\left|\sum_{l=-\infty}^{\infty} g[l]h[n-l] + \sum_{l=-\infty}^{\infty} g[l]v[n-l] - h[n-\Delta]\right|^2\right] = \quad (8)$$

-continued $$\sigma_h^2 \left( \sum_{k=-\infty}^{\infty} \sum_{l=-\infty}^{\infty} g[k]g[l] J_0(2\pi f_d(k-l)T_s) + J_0(0) + \frac{\sigma_v^2}{\sigma_h^2} \sum_{k=-\infty}^{\infty} g^2[k] - 2 \sum_{k=-\infty}^{\infty} g[k] J_0(2\pi f_d(k-\Delta)T_s) \right)$$

In Equation (8) above, $\Delta$ denotes a group delay generated by the low pass filter 222, $T_s$ denotes an interval between input samples, and $\sigma_h^2$ denotes a variance of an energy of a channel. $\sigma_v^2$ denotes a variance of noise and $f_d$ denotes a Doppler frequency. E[ ] denotes an average, g[ ] denotes an impulse response of the low pass filter 222. For example, g[1] may indicate a first value of the impulse response. h[n−1] denotes a theoretical channel value of an (n−1)$^{th}$ tap and h[n−$\Delta$] denotes a theoretical channel value in which the group delay is cancelled from the n$^{th}$ tap. v[ ] denotes noise and, for example, v[n−1] may indicate an (n−1)$^{th}$ sample of the noise signal. $J_o$ denotes a zeroth (0$^{th}$) order Bessel function of the first kind.

Figure 2C:
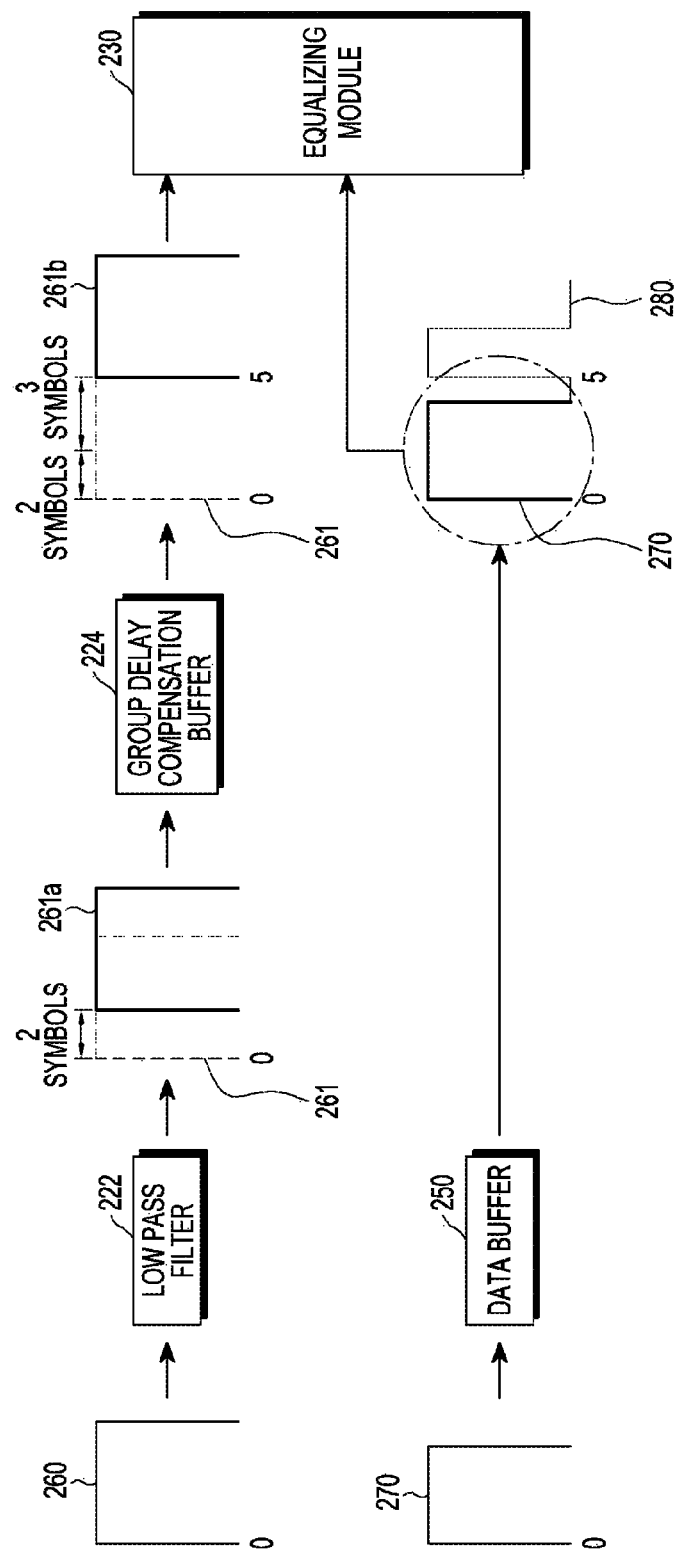
FIG. 2C illustrates operations for compensating for a group delay according to various embodiments of the present disclosure.

The control module 240 may control the group delay compensation buffer 224 to delay and output the channel estimation value $h_0[r]$, which has been input into the group delay compensation buffer 224 and has passed through the low pass filtering, by a specific time. The control module 240 may determine a delay time of the channel estimation value output from the group delay compensation buffer 224 based on the group delay of the low pass filter 222 determined with reference to the lookup table and the storage period of the data buffer 250, and output the channel estimation value $h_0[r]$ according to the delay time, so as to adaptively compensate for the group delay. An operation for adaptively compensating for the group delay will be described with reference to FIG. 2C. FIG. 2C illustrates operations for compensating for the group delay according to various embodiments of the present disclosure.

Referring to FIG. 2C, a channel signal 260 including a channel estimation value $h_{raw}[r]$ may be input and stored in the low pass filter 222. Further, a data signal 270 including specific data may be input and stored in the data buffer 250. For the description of the present disclosure, FIG. 2C illustrates a case where the storage period of the data signal 270 is 5 symbols as an example. A channel signal 261 including a channel estimation value $h_0[r]$ having passed through the low pass filtering by the low pass filter 222 may generate the group delay by the low pass filtering. In FIG. 2C, a case where the group delay is 2 symbols is illustrated as an example. A delayed channel signal 261a is input into the group delay compensation buffer 224. The control module 240 may delay the channel signal 261a input into the group delay compensation buffer 224 in order to compensate for the group delay according to the low pass filtering. The control module 240 may delay and output the channel signal 261a input into the group delay compensation buffer 224 to match the storage period of the data buffer 250 based on the storage period (for example, 5 symbols) of the data buffer 250 and the group delay (for example, 2 symbols) determined based on the lookup table. For example, the control module 240 may delay and output the channel signal 261a by 3 symbols and the delayed signal 261b may be input into the equalizing module 230. Further, the control module 240 may transmit the data signal 270, which is delayed by the 5 symbols, from the data buffer 250, rather than a newly input data signal 280, to the equalizing module 230. As described above, the communication device 100 according to various embodiments of the present disclosure may adaptively change the delay period of the channel signal (for example, the channel signal 261a) according to the group delay of the low pass filter 222 to have a predetermined channel estimation gain or equalizing gain in various wireless communication environments.

The control module 240 according to various embodiments of the present disclosure may multiply a channel signal 261b output from the group delay compensation buffer 224 by a weight and then transmit the product of the multiplication to the equalizing module 230. Through the weight, the mean square error between the channel estimation value $h_0[r]$ and the theoretical channel value h[r] may be minimized. The weight may be calculated through Equation (9) below.

$$wgt[r] = \begin{cases} \dfrac{N_c E[|h_0[r]|^2] - I_o \sum_{n=-\infty}^{\infty} g_r[n]}{N_c E[|h_0[r]|^2]}, & \text{if } N_c E[|h_0[r]|^2] \geq \beta I_o \sum_{n=-\infty}^{\infty} g_r[n] \\ 0, & \text{otherwise} \end{cases} \quad (9)$$

In Equation (9) above, $g_r[n]$ denotes an n$^{th}$ value of an impulse response of the low pass filter through which a signal (for example, a channel signal) for an r$^{th}$ tap passes, $\beta$ denotes a programmable value used for determining whether to apply the weight according to a level of noise for a particular tap. For example, when a strength of the noise for the particular tap (for example, the r$^{th}$ tap) is greater than or equal to a threshold, the weight may be configured as 0, that is, $\beta$ may denote a programmable value for determining whether to activate a channel estimation value. According to various embodiments of the present disclosure, the control module 240 may perform a calculation of multiplying the channel estimation value $h_0[r]$ by the weight before the channel estimation value $h_0[r]$ is input into the group delay compensation buffer 224.

The equalizing module 230 may perform equalizing by using the channel signal 261b multiplied by the weight and the data signal 270.

Figure 3:
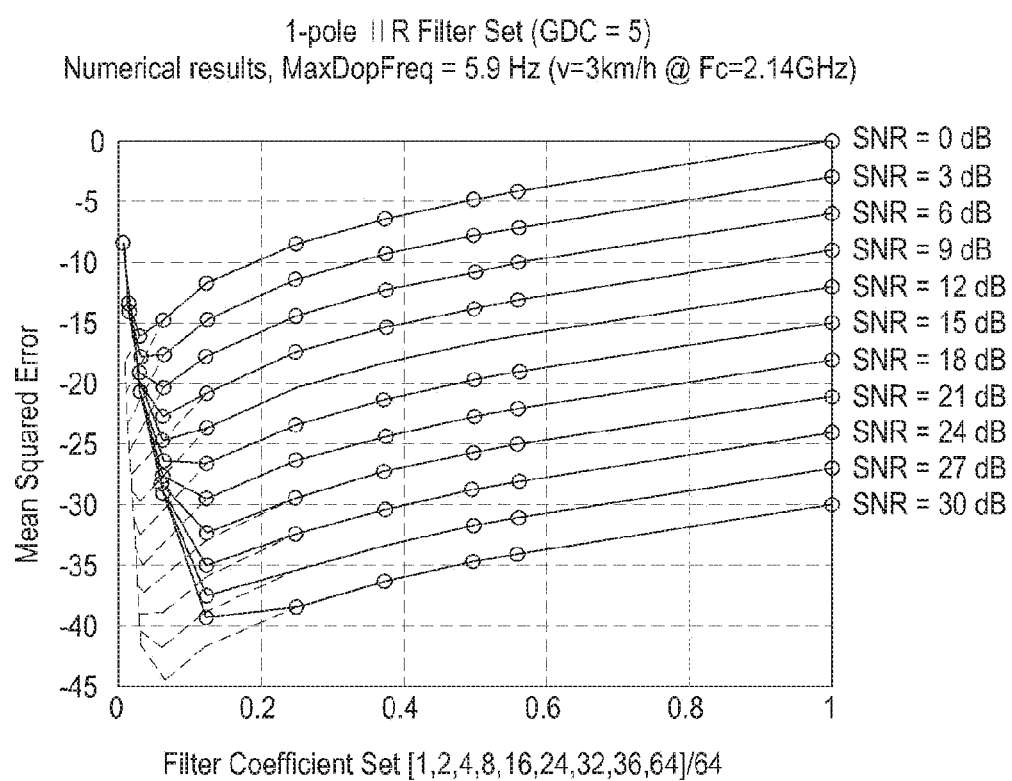
FIG. 3 is a graph showing a correlation between a mean square error and a filter coefficient as a function of SNR in a communication device according to various embodiments of the present disclosure.

FIG. 3 is a graph showing a correlation between a mean square error and a filter coefficient as a function of SNR in a communication device according to various embodiments of the present disclosure Referring to FIG. 3, a dotted line shows a theoretically calculated minimum mean error in a particular bandwidth, and a solid line shows a mean error when the group delay is configured as a natural number (for example, 5 symbols). The coefficient of the low pass filter 222 may be determined as a value that makes the mean square error a minimum as described above. For example, referring to FIG. 3, when the SNR is 18 dB and the Doppler frequency is 5.9 Hz, the coefficient of the low pass filter may be determined as 0.125. Such information may be stored in the lookup table.

Although it is described that the down sampling module 210, the channel estimation module 220, the equalizing module 230, the control module 240, and the data buffer 250 correspond to elements included in the processor 200 in the present disclosure, at least some of the down sampling module 210, the channel estimation module 220, the equalizing module 230, the control module 240, and the data buffer 250 may be separated from the processor 200.

Figure 4:
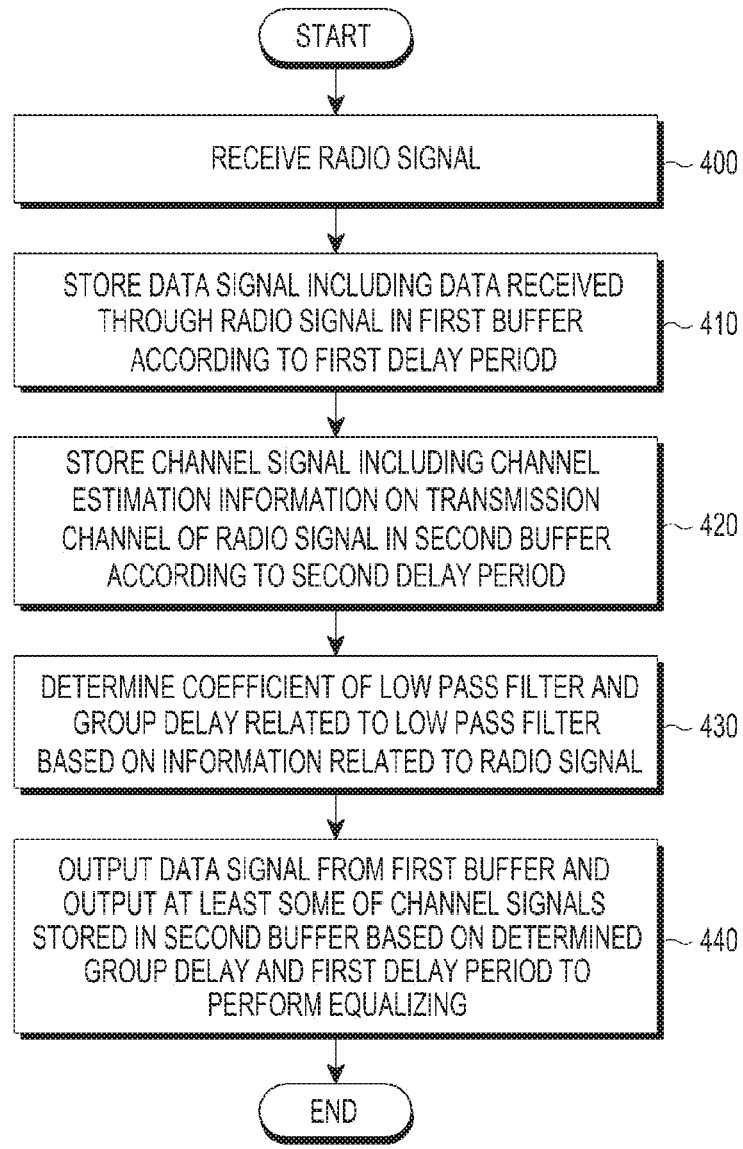
FIG. 4 is a flowchart of a method of controlling a communication device according to various embodiments of the present disclosure.

FIG. 4 is a flowchart of a method of controlling a communication device according to various embodiments of the present disclosure.

Referring to FIG. 4, the method of controlling the communication device 100 includes in step 400, receiving a radio signal, and in step 410, storing a data signal including data received through the radio signal in a first buffer according to a first delay period.

The method of controlling the communication device 100 includes in step 420, storing a channel signal including channel estimation information on a transmission channel of the radio signal in a second buffer according to a second delay period.

The method of controlling the communication device 100 includes in step 430, determining a coefficient of the low pass filter and a group delay related to the low pass filter based on information related to the radio signal.

The method of controlling the communication device 100 includes in step 440, outputting the data signal from the first buffer and outputting at least some of the channel signals stored in the second buffer based on the determined group delay and the first delay period, so as to perform equalizing.

Further, the description of the communication device 100 may be equally applied to the method of controlling the communication device 100, according to various embodiments of the present disclosure.

Figure 5:
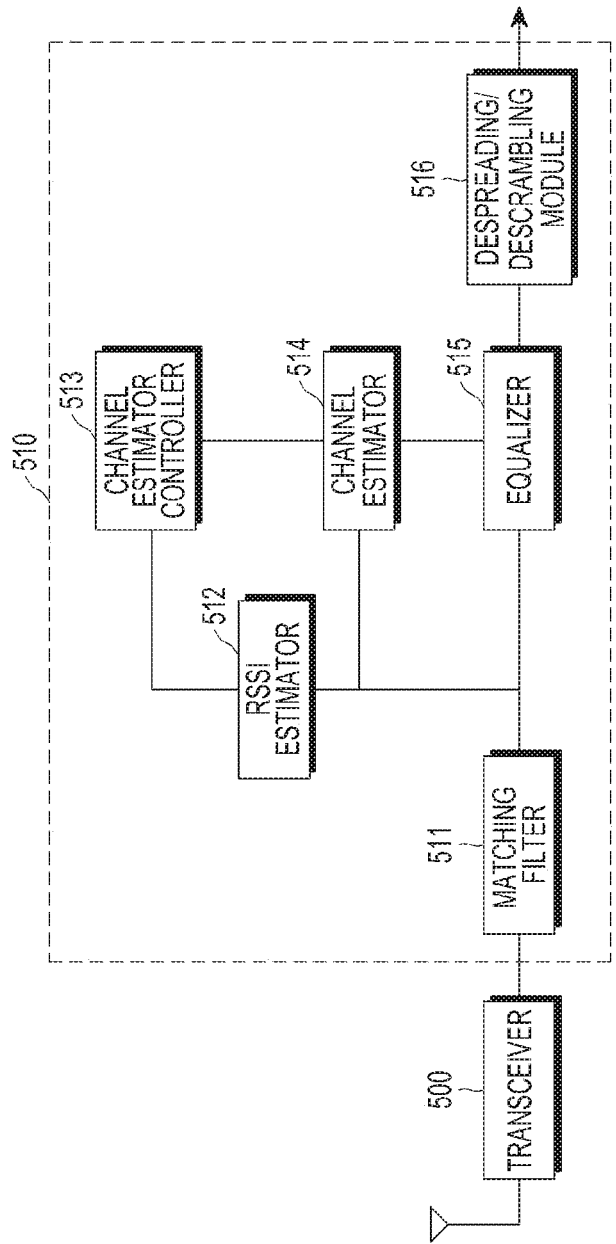
FIG. 5 is a block diagram of components of a processor according to various embodiments of the present disclosure.

FIG. 5 is a block diagram of components of a processor according to various embodiments of the present disclosure.

Referring to FIG. 5, the communication device includes a transceiver 500 and a processor 510. The processor 510 includes a matching filter 511, an RSSI estimator 512, a channel estimator controller 513, a channel estimator 514, an equalizer 515, and a despreading/descrambling module 516.

The transceiver 500 may receive a radio signal. The radio signal received through the transceiver 500 is input into the matching filter 511. The RSSI estimator 512 may estimate a received signal strength of the received radio signal. Although FIG. 5 illustrates that the RSSI estimator 512 is included in the processor 510, the RSSI estimator 512 may be separated from the processor 510 according to various embodiments of the present disclosure. The channel estimator controller 513 may control the channel estimator 514. The channel estimator 514 may estimate a transmission channel in which the radio signal or the data is transmitted. The equalizer 515 may perform equalizing based on a channel signal and a data signal. The despreading/descrambling module 516 may despread and/or descramble a particular signal.

Figure 6:
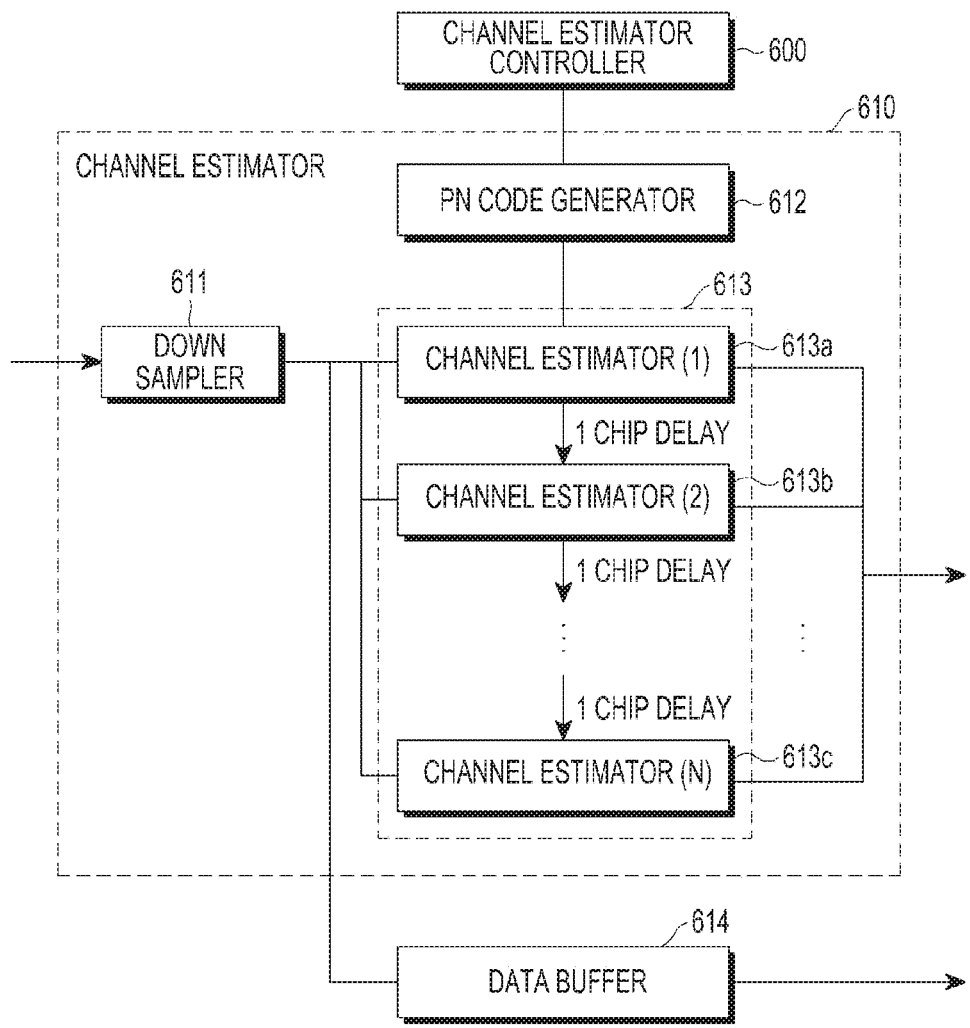
FIG. 6 is a block diagram of a channel estimator according to various embodiments of the present disclosure.

FIG. 6 is a block diagram of a channel estimator according to various embodiments of the present disclosure.

Referring to FIG. 6, a channel estimator 610 may be electrically connected to a channel estimator controller 600. The channel estimator 610 includes a down sampler 611, a Pseudo Noise (PN) code generator 612, and one or more channel estimators 613a, 613b, and 613c. In FIG. 6, the one or more channel estimators 613a, 613b, and 613c are illustrated as a cluster 613 of the channel estimators. FIG. 6 illustrates, as an example, a case where parallel channel estimation is performed on n consecutive taps having a delay time difference of a 1 chip interval and, accordingly, illustrates multi-tap channel estimators 613a, 613b, and 613c having a channel estimation range of n chips. Thus, n channel estimators 613a, 613b, and 613c for estimating channels by using pilot signals corresponding to respective taps are required.

The PN code generator 612 may generate a scrambling code required for the despreading of the signal, an Orthogonal Variable Spreading Factor (OVSF) code, and a signal of an antenna pattern and then despread a signal (for example, a pilot signal) based on the generated signal. The generated PN code may be delayed by 1 chip and transmitted to the n channel estimators 613, and a PN code delayed by (n−1) chips may be transmitted to the nth channel estimator 613c.

The channel estimators 610 may be electrically connected to the data buffer 614, and the above description of the data buffer 250 may be equally applied to the data buffer 614.

Figure 7:
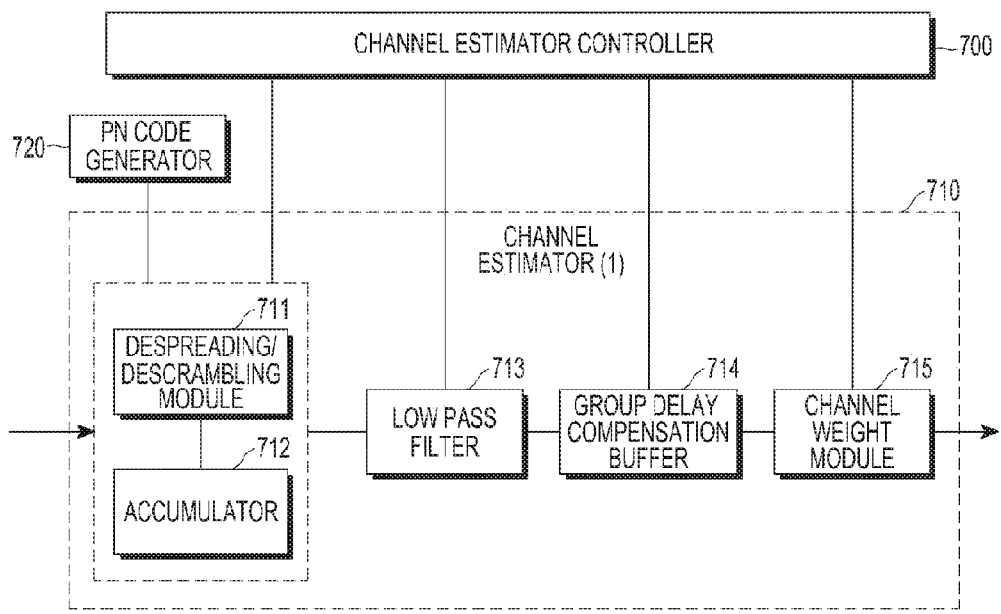
FIG. 7 is a block diagram of one channel estimator included in a cluster of channel estimators according to various embodiments of the present disclosure.

FIG. 7 is a block diagram of one channel estimator included in a cluster of channel estimators according to various embodiments of the present disclosure.

Referring to FIG. 7, one channel estimator 710 includes a despreading/descrambling module 711 for despreading and/or descrambling a received signal and an accumulator 712. The channel estimator 710 includes a low pass filter 713, a group delay compensation buffer 714, and a channel weight module 715. The above description of the low pass filter 222 and the group delay compensation buffer 224 may be equally applied to the low pass filter 713 and the group delay compensation buffer 714. The channel weight module 715 may assign a weight, which is calculated by the channel estimator controller 700, to a channel estimation value. The despreading/descrambling module 711 and the accumulator 712 may be electrically connected to the PN code generator 720.

Figure 8:
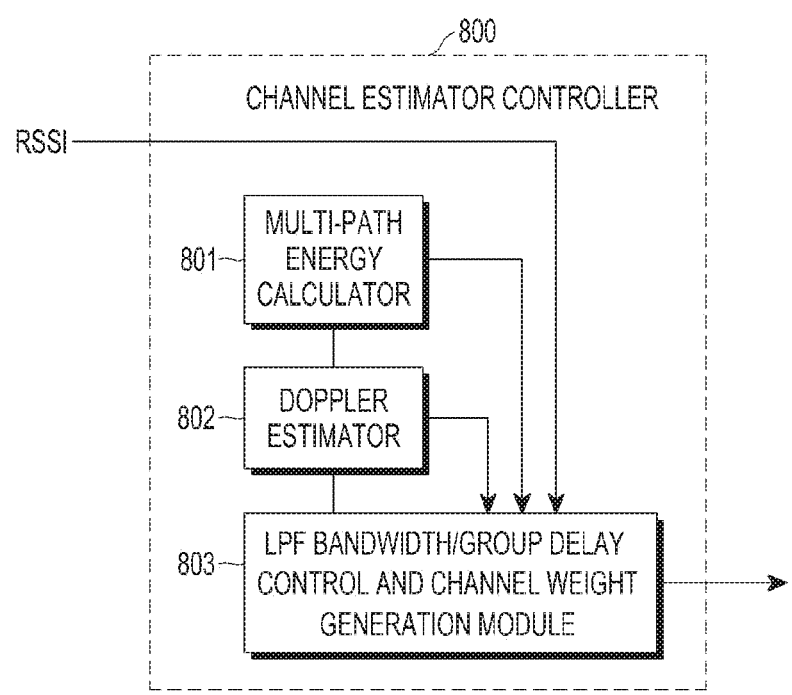
FIG. 8 is a block diagram of a channel estimator controller according to various embodiments of the present disclosure.

FIG. 8 is a block diagram of a channel estimator controller according to various embodiments of the present disclosure.

A channel estimator controller 800 includes a multi-path energy calculator 801, a Doppler estimator 802, an LPF control and channel weight generation module 803.

The multi-path energy calculator 801 may calculate an energy of a channel signal or a data signal. The Doppler estimator 802 may estimate a Doppler frequency (or Doppler spread) of each tap. The LPF control and channel weight generation module 803 may receive information on a received signal strength from, for example, the AGC, and calculate an SNR of each tap.

Figure 9:
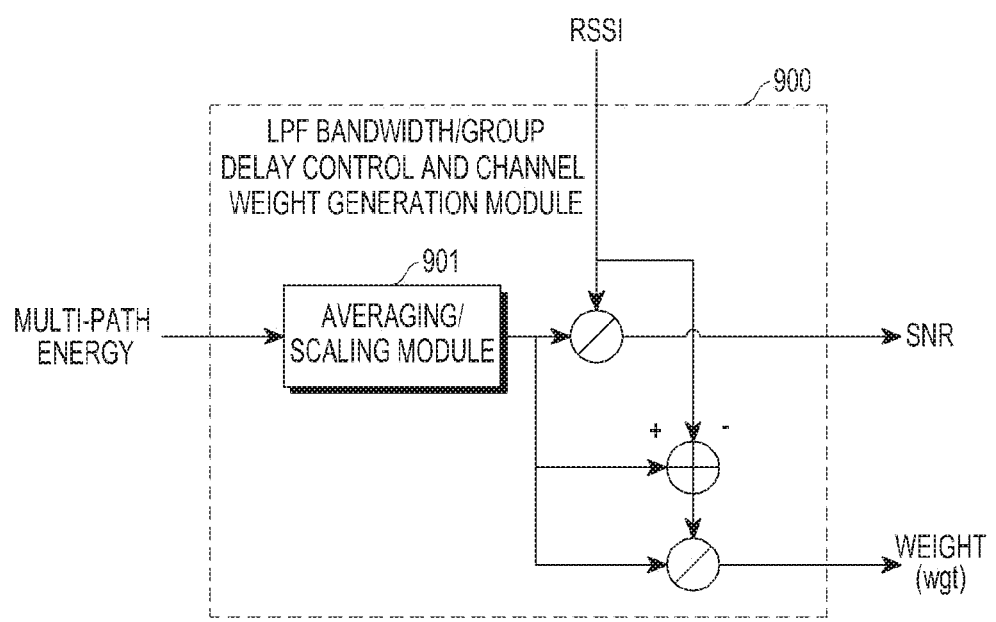
FIG. 9 is a block diagram of an LPF control and channel weight generation module according to various embodiments of the present disclosure.

FIG. 9 is a block diagram of an LPF control and channel weight generation module according to various embodiments of the present disclosure.

Referring to FIG. 9, an LPF control and channel weight generation module 900 may receive information on the transmitted received signal strength and information on an energy (in other words, multi-path energy) estimated for the data signal and the channel signal and calculate the SNR and the weight of each tap. The LPF control and channel weight generation module 900 includes an averaging/scaling module 901 for averaging and/or scaling a particular signal.

The term "module" as used herein may, for example, refer to a unit including one of hardware, software, and firmware or a combination of two or more. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which is known or is yet to be developed.

According to various embodiments of the present disclosure, at least some of the devices (for example, modules or functions thereof) or the method (for example, operations) according to the present disclosure may be implemented by a command stored in a computer-readable storage medium in a programming module form. The instruction, when executed by a processor (e.g., the processor 102), may cause the one or more processors to execute the function corresponding to the instruction. The computer-readable storage medium may be, for example, the memory 103.

The computer readable recording medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory, a magnetoresistive random-access memory (MRAM)), and the like. In addition, the program instructions may include high level language codes, which can be executed in a computer by using an interpreter, as well as machine codes produced by a compiler. The aforementioned hardware device may be configured to operate as one or more software modules in order to perform the operation of the present disclosure, and vice versa.

The programming module according to an embodiment of the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

Various embodiments disclosed herein are provided merely to describe technical details of the present disclosure and to help the understanding of the present disclosure, and do not limit the scope of the present disclosure. Therefore, it should be construed that all modifications and changes or modified and changed forms based on the technical idea of the present disclosure fall within the scope of the present disclosure. Thus, the scope of the present disclosure should not be limited to the above-described embodiments of the present disclosure, but should rather be defined by the appended claims and equivalents thereof.

What is claimed is:

1. A communication device comprising:
a transceiver that receives a radio signal; and
a processor electrically connected to the transceiver,
wherein the processor is configured to
store a data signal including data received through the radio signal in a first buffer according to a first delay period,
store a channel signal including channel estimation information on a transmission channel of the radio signal in a second buffer according to a second delay period,
determine a coefficient of a low pass filter and a group delay related to the low pass filter based on information related to the radio signal, and
output at least a part of the channel signal stored in the second buffer based on the determined group delay and the first delay period to perform equalizing.

2. The communication device of claim 1, wherein the information related to the radio signal includes a signal to noise ratio (SNR) of the radio signal and a Doppler frequency of the radio signal.

3. The communication device of claim 2, wherein the processor is further configured to estimate the SNR by using information related to a received signal strength estimated by an automatic gain controller.

4. The communication device of claim 1, wherein the processor is further configured to assign a weight calculated based on the radio signal to the channel estimation information.

5. The communication device of claim 4, wherein the processor is further configured to perform the equalizing based on the channel signal to which the weight is assigned and the data signal output from the first buffer.

6. The communication device of claim 1, wherein the coefficient of the low pass filter is a coefficient which minimizes a Mean Square Error (MSE) of a first signal before low pass filtering of the received radio signal and a second signal after low pass filtering of the received radio signal.

7. The communication device of claim 1, wherein the processor is further configured to calculate a difference between the first delay period and the group delay, and to control the second buffer to delay and output the channel signal according to a delay time corresponding to a result of the calculation.

8. The communication device of claim 1, wherein the first delay period has a value larger than the second delay period.

9. A method of controlling a communication device, the method comprising:
receiving a radio signal;
storing a data signal including data received through the radio signal in a first buffer according to a first delay period;
storing a channel signal including channel estimation information on a transmission channel of the radio signal in a second buffer according to a second delay period;
determining a coefficient of a low pass filter and a group delay related to the low pass filter based on information related to the radio signal; and
outputting at least a part of the channel signal stored in the second buffer based on the determined group delay and the first delay period to perform equalizing.

10. The method of claim 9, wherein the information related to the radio signal includes a signal to noise ratio (SNR) of the radio signal and a Doppler frequency of the radio signal.

11. The method of claim 10, further comprising estimating the SNR by using information related to a received signal strength estimated by an automatic gain controller.

12. The method of claim 9, further comprising assigning a weight calculated based on the radio signal to the channel estimation information.

13. The method of claim 12, further comprising performing the equalizing based on the channel signal to which the weight is assigned and the data signal output from the first buffer.

14. The method of claim 9, wherein the coefficient of the low pass filter is a coefficient which minimizes a Mean Square Error (MSE) of a first signal before low pass filtering of the received radio signal and a second signal after the low pass filtering of the received radio signal.

15. The method of claim 9, further comprising:
calculating a difference between the first delay period and the group delay; and
delaying the channel signal according to a delay time corresponding to a result of the calculation and outputting the channel signal from the second buffer.

16. A chipset for controlling a user equipment (UE) in a mobile communication system, the chipset configured to:
store a data signal including data received through a radio signal in a first buffer according to a first delay period;

store a channel signal including channel estimation information on a transmission channel of the radio signal in a second buffer according to a second delay period;

determine a coefficient of a low pass filter and a group delay related to the low pass filter based on information related to the radio signal; and output at least a part of the channel signal stored in the second buffer based on the determined group delay and the first delay period to perform equalizing.

17. The chipset of claim 16, wherein the mobile communication system is at least one of LTE, LTE-A, CDMA, WCDMA, UMTS, WiBro, and GSM.

18. The chipset of claim 16, further comprising an applications processor for executing software application programs.

19. The chipset of claim 16, further comprising a memory, wherein the memory is at least one of RAM, ROM, Flash and MRAM.

20. The chipset of claim 16, wherein the chipset is further configured for wireless communication according to a short-range communication protocol, and wherein the short-range communication protocol is at least one of Wi-Fi, Bluetooth, NFC, and GNSS.

* * * * *